(No Model.) 2 Sheets—Sheet 2.
G. G. SEEGER.
COMBINED HARROW AND ROLLER.
No. 273,320. Patented Mar. 6, 1883.
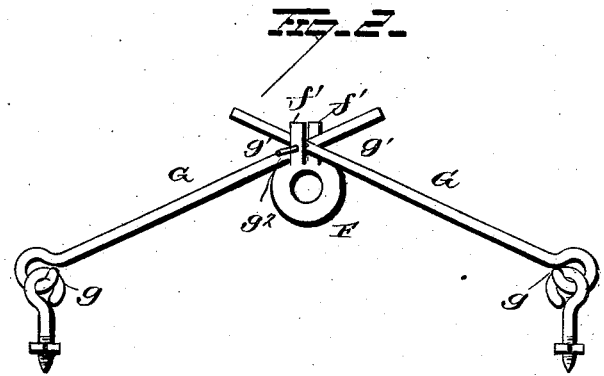
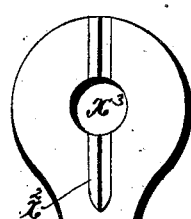
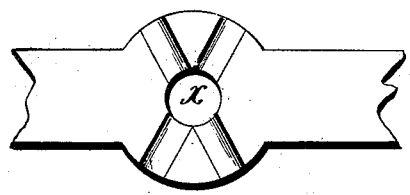
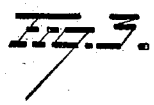
WITNESSES
S. G. Nottingham
George F. Downing
INVENTOR
Geo. G. Seeger
By H. A. Symons
Attorney

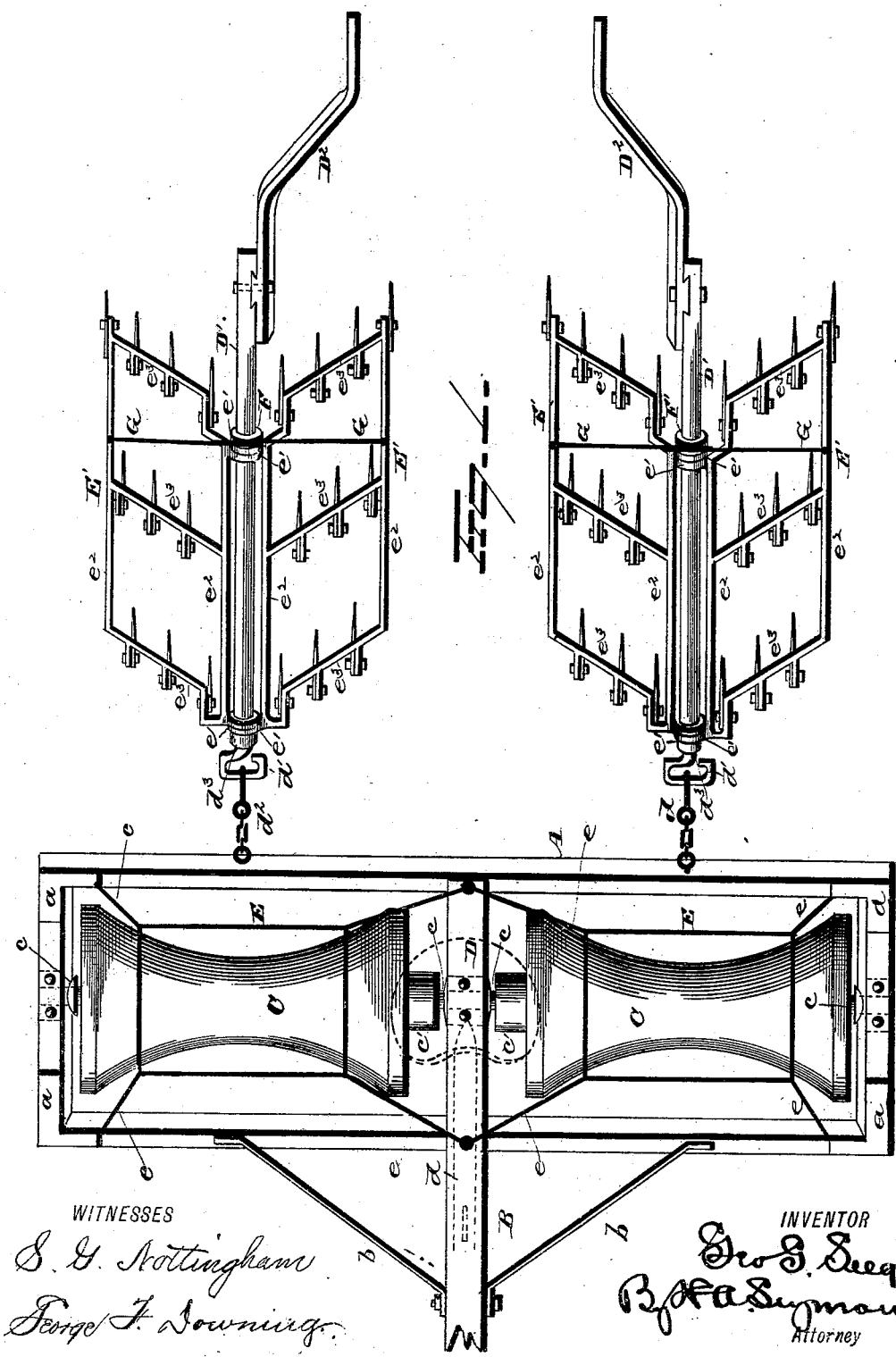

UNITED STATES PATENT OFFICE.

GEORGE G. SEEGER, OF HILLSDALE, IOWA.

COMBINED HARROW AND ROLLER.

SPECIFICATION forming part of Letters Patent No. 273,320, dated March 6, 1883.

Application filed June 17, 1882. (No model.)

*To all whom it may concern:*

Be it known that I, GEORGE GUSTAVE SEEGER, of Hillsdale, in the county of Mills and State of Iowa, have invented certain new and useful Improvements in Harrows and Combined Land Rollers and Harrows; and I do hereby declare the following to be a full, clear, and exact description of the invention, such as will enable others skilled in the art to which it pertains to make and use the same.

My invention relates to harrows and to a combined land roller and harrow, the object being to provide a combined machine capable of rolling and harrowing the hills between the furrows of a field, and thus clearing the latter of weeds, &c.

The invention consists, first, in a harrow of the improved construction hereinafter described.

The invention further consists in the features of construction and combinations of parts as hereinafter fully described, and pointed out in the claims.

In the accompanying drawings, Figure 1 is a plan view of my combined roller and harrow. Figs. 2 and 3 illustrate parts in detail. Fig. 4 is a transverse section of one of the harrows.

A represents a frame, preferably of rectangular form and provided with metallic corner-pieces $a$, and supporting a tongue, B. C C represent the rollers, journaled within the frame in suitable bearings, $c$. These rollers are of concave form, having their bearing-surfaces hollowed out to adapt them to pass over and roll the hills or elevations of the soil.

C' C' represent washers placed between the inner ends of the rollers and their inner bearings.

A suitable seat, D, (in dotted lines, Fig. 1,) is secured upon the tongue B by a spring-support, $d$.

A guard frame or support, E, is secured to the top of the roller-frame by arms $e$. This frame extends sufficiently above the roller-frame to admit of the free revolution of the rollers, and is adapted to receive the harrows during transportation.

The tongue B is braced to the roller-frame by braces $b$.

The drawings illustrate two rollers and two harrows; but it is evident that, if desired, only a single roller and harrow need be employed, and as both harrows are of the same construction the following description will apply equally to both.

D' represents a central bar or beam, having at its forward end a hook, $d'$, to which is attached a chain or link, $d^2$, the opposite end of which is secured to the rear bar of the harrow-frame.

E' E' represent two harrow-sections, each provided with any desired number of eyes or rings, $e'$, through which the beam D passes. Each section of the harrow consists of the side bars, $e^2$, and the horizontally-curved supporting cross-bars $e^3$, the latter being preferably arranged at an incline to the side bars and of the bent form shown. The sections E E are prevented from longitudinal displacement by a collar, $d^3$, formed upon the beam D, near the forward end of the latter, and a ring, F, keyed upon the beam just in rear of the rear rings, $e'$, of the sections. This ring F is provided with two upwardly-projecting perforated lugs or arms, $f'$, which constitute a fork adapted to receive the inner overlapping ends of two adjustable coupling-bars, G G. The latter are secured at their outer ends by swivel-connections $g$ $g$ to the outer side bars of the harrow-sections, while their inner ends, $g'$ $g'$, are perforated to correspond with the perforations of the fork $f'$ $f'$, and overlap within the said fork and are held by a pin, $g^2$. By means of these bars G G either or both sections of the harrow may be raised and lowered to regulate the depth of insertion of the teeth into the soil and to elevate the outer teeth above the ground.

To the outer end of each of the beams D', I secure an inwardly-bent handle, D². These handles approach each other sufficiently to enable them to be grasped by the operator, one in each hand, after the manner of plow-handles.

In Fig. 3 is represented a detached view of a portion of one of the tooth-supporting bars formed with two inclined grooves, $x$ $x$, and a bolt-hole, $x'$. These grooves cross each other, as shown, and the hole $x'$ is formed so it will divide them centrally. The tooth is formed with a corresponding rib, $x^2$, and a bolt-hole, $x^3$, and is adapted to be secured to the bar by inserting the rib $x^2$ into one of the grooves $x$ and then passing a bolt through the holes $x'$ $x^3$. Thus the tooth may be arranged to incline either frontward or rearward, as may be desired, and is securely held by the tongue-and-groove connection and its bolt.

The harrow-sections are readily adjusted by means of the adjustable coupling-bars, the latter being swiveled to the outer bars of said sections.

It will be apparent that I may make many slight alterations in the details of construction of my improved machine without departing from the spirit of my invention. Hence I do not limit myself to the exact construction shown and described.

Having fully described my invention, what I claim as new, and desire to secure by Letters Patent, is—

1. In a harrow, the combination, with a central bar, of two harrow-sections each provided with rings swiveled to said bar, and each constructed with transverse curved bars having teeth secured thereto and provided with overlapping coupling-bars, substantially as set forth.

2. In a harrow, the combination, with a central bar and two independent harrow-sections whose inner sides are pivoted upon said bar, of adjustable cross-bars flexibly connected to the outer sides of the harrow-sections and overlapping at their inner ends, and adapted to adjust said sections vertically and hold them rigidly in position, substantially as set forth.

3. In a harrow, the combination, with a central bar and two independent harrow-sections pivoted thereto, of a ring keyed to said bar and provided with upwardly-projecting perforated arms and adjustable coupling-bars, substantially as set forth.

4. In a harrow, the combination, with a bar formed with a bolt-hole and a groove adapted to receive a harrow-tooth, of a tooth formed with a rib and a bolt-hole corresponding to said bar, substantially as set forth.

5. In a combined land roller and harrow, the combination, with a supporting-frame, of a concave roller and a harrow whose tooth-bars are similarly concave in form, substantially as set forth.

6. In a combined land roller and harrow, the combination, with a double-roller frame, of two concave rollers, two harrows secured to the roller-frame, and each having a central bar or beam, and an inwardly-turned handle, substantially as set forth.

7. In a combined land roller and harrow, the combination, with the roller-frame and concave rollers, of two harrows flexibly connected to the roller-frame, and each consisting of a central bar, and two independent curved harrow-sections pivoted to said bar, in combination with a ring having vertical arms and two adjustable coupling-bars, substantially as set forth.

In testimony whereof I have signed this specification in the presence of two subscribing witnesses.

GEORGE GUSTAVE SEEGER.

Witnesses:
　TILMAN SAWYERS,
　C. M. PHIPPS.